(12) United States Patent
Ohba et al.

(10) Patent No.: US 6,605,344 B1
(45) Date of Patent: Aug. 12, 2003

(54) GAS-BARRIER FILMS

(75) Inventors: Hiroyuki Ohba, Ibaraki (JP); Hideaki Tanaka, Ibaraki (JP); Tomoaki Sato, Ibaraki (JP); Tomohisa Hasegawa, Ibaraki (JP); Toru Saika, Ibaraki (JP)

(73) Assignee: Kureha Chemical Industry Co., Ltd., Tokyo (JP)

(*) Notice: Subject to any disclaimer, the term of this patent is extended or adjusted under 35 U.S.C. 154(b) by 0 days.

(21) Appl. No.: 09/673,086

(22) PCT Filed: Apr. 13, 1999

(86) PCT No.: PCT/JP99/01969
§ 371 (c)(1),
(2), (4) Date: Oct. 11, 2000

(87) PCT Pub. No.: WO99/52973
PCT Pub. Date: Oct. 21, 1999

(30) Foreign Application Priority Data

Apr. 15, 1998 (JP) ............................................. 10-121835
Apr. 12, 1999 (JP) ............................................. 11-104523

(51) Int. Cl.$^7$ ................................................ B32B 27/30
(52) U.S. Cl. ...................... 428/332; 428/520; 428/522; 428/461; 427/388.4
(58) Field of Search .................. 428/520, 522, 428/461, 332; 427/372.2, 376.6, 388.4

(56) References Cited

U.S. PATENT DOCUMENTS

| | | |
|---|---|---|
| 5,175,054 A | 12/1992 | Chu |
| 5,192,620 A | 3/1993 | Chu et al. |
| 5,518,792 A | 5/1996 | Masuda et al. ............ 428/36.6 |
| 6,011,115 A * | 1/2000 | Miharu et al. ............. 428/34.1 |
| 6,194,040 B1 * | 2/2001 | Delius et al. ............ 138/118.1 |
| 6,200,680 B1 * | 3/2001 | Takeda et al. .............. 423/111 |

FOREIGN PATENT DOCUMENTS

| | | |
|---|---|---|
| EP | 0 698 634 A1 | 2/1996 |
| JP | 51-134737 | 11/1976 |
| JP | 5-295141 | 11/1993 |
| JP | 7-101468 | 4/1995 |
| JP | 7-266508 | 10/1995 |
| JP | 9-201897 | 8/1997 |

* cited by examiner

Primary Examiner—D. Lawrence Tarazano
(74) Attorney, Agent, or Firm—Nixon & Vanderhye P.C.

(57) ABSTRACT

The present invention provides a gas-barrier film which is produced through applying a layer containing a metallic compound to a surface of a processed-polymer layer produced from a mixture of a polyalcohol and at least one poly(meth)acrylic polymer selected from the group consisting of poly(meth)acrylic acids and partially neutralized poly(meth)acrylic acids. The invention also provides a laminated gas-barrier film containing the aforementioned gas-barrier film either surface of which is laminated on with a plastic film. The gas-barrier film exhibits excellent gas-barrier properties and can be produced through a simple, convenient process.

19 Claims, No Drawings

GAS-BARRIER FILMS

TECHNICAL FIELD

The present invention relates to a gas-barrier film which is produced through application of a metallic compound to the surface of a polymer layer formed from a specific polymer, and more particularly to a gas-barrier film which is produced through application of a metallic compound to a polymer layer formed from a mixture of a poly(meth)acrylic acid polymer and a polyalcohol such as sugar. The present invention provides a gas-barrier film which exhibits excellent oxygen-gas-barrier properties, particularly in an atmosphere of high humidity, and which is suitably used in sterilization treatment such as retorting or boiling.

BACKGROUND ART

Conventionally, in order to enhance gas-barrier properties of plastic films, several processes have been proposed. For example, Japanese Patent Application Laid-Open (kokai) No. 9-157406 discloses a process in which an inorganic layer compound serving as a filler is incorporated into a plastic film, and Japanese Patent Application LaidOpen (kokai) No. 4-366142 discloses a process in which an inorganic compound is deposited on the surface of a plastic film. In the former process, in order to enhance gas-barrier properties of a plastic film, a large amount of inorganic layer compound must be incorporated into the film, and thus properties of a matrix resin, such as transparency and mechanical strength, are impaired. In the latter process, deposition is carried out at high temperature to form a thin film, and a plastic layer may soften due to heat load, and thus a heat-resistant plastic such as polyethylene terephthalate, polybutylene terephthalate, polyethylene naphthalate, or polyimide must be exclusively employed. Also, the latter process is disadvantageous in that when a resin of low Young's modulus is employed, gas-barrier properties of a produced film may deteriorate, since the tensile strength of the resin decreases during deposition and the deposited film is prone to crack.

The latter process is also disadvantageous in that operation is cumbersome and an expensive apparatus is required, since deposition must be carried out in a vacuum apparatus. Japanese Patent Application Laid-Open (kokai) No. 8-142256 discloses a moisture-resistant composite deposition film comprising at least one laminated structure containing a polymer film substrate (A), a deposition film (B) formed of inorganic material which is laminated on at least one surface of the substrate (A), a water-resistant film (C) formed of a sugar and a polycarboxylic acid or a partially neutralized polycarboxylic acid, the film (C) being laminated on the film (B); and a polymer composition layer (D) containing a drying agent, such that the layer (D) is provided on at least one side of the laminated structure. However, the composition film may involve drawbacks similar to those as described above, since a deposition film is employed in the composite film. Therefore, there has been demand for a process for producing a gas-barrier film more simply and conveniently.

In view of the foregoing, an object of the present invention is to provide a gas-barrier film which can be produced through a simple, convenient process and which exhibits excellent gas-barrier properties.

DISCLOSURE OF THE INVENTION

The present inventors have found that the aforementioned problems can be solved by a gas-barrier film which is produced through application of a layer containing a metallic compound (hereinafter the layer may be referred to as a "metallic-compound-containing layer") to the surface of a polymer layer formed from a mixture of a polyalcohol and at least one poly(meth)acrylic acid polymer selected from the group consisting of poly(meth)acrylic acids and partially neutralized poly(meth)acrylic acids. The present invention has been accomplished on the basis of this finding. Japanese Patent Application Laid-Open (kokai) No. 8-224825 discloses a gas-barrier laminate which is produced from a plastic film and a metallic compound. Japanese Patent Application LaidOpen (kokai) No. 58-128852 discloses a laminate exhibiting excellent adhesion, which is produced from a plastic film and a carboxyl-group-containing polyolefin film with the intervention of a metallic compound. In the aforementioned laminates, metallic compound layers of continuous phase are formed through deposition or sputtering.

Accordingly, in a first aspect of the present invention, there is provided a gas-barrier film which is produced through applying a layer containing a metallic compound to the surface of a polymer layer formed from a mixture of a polyalcohol and at least one poly(meth)acrylic acid polymer selected from the group consisting of poly(meth)acrylic acids and partially neutralized poly(meth)acrylic acids. There is also provided a gas-barrier film wherein the surface of the polymer layer to which the metallic-compound-containing layer is not applied is fixed onto a surface of a substrate. There is also provided a gas-barrier film wherein at least the polymer layer is subjected to heat treatment. There is also provided a gas-barrier film wherein the metallic compound is at least one species selected from the group consisting of magnesium oxide, calcium oxide, zinc oxide, magnesium hydroxide, calcium hydroxide, and zinc hydroxide. There is also provided a gas-barrier film wherein the metallic-compound-containing layer is produced from a mixture of the metallic compound and a resin. There is also provided a gas-barrier film for use in sterilization treatment.

In a second aspect of the present invention, there is provided a laminated gas-barrier film comprising a gas-barrier film as recited in the first aspect, wherein a plastic film is laminated on either surface of the gas-barrier film.

BEST MODE FOR CARRYING OUT THE INVENTION

The present invention will next be described in detail.

In the present invention, a metallic-compound-containing layer which is applied to the surface of a polymer layer may be a layer containing a metallic compound alone, or a layer containing a resin in which a metallic compound is mixed or dispersed (hereinafter the layer will be referred to as "layer of a mixture of metallic compound and resin"). As used herein, the phrase "a metallic-compound-containing layer is applied to the surface of a polymer layer" refers to "a metallic compound or a suspension of a mixture of metallic compound and resin is applied or sprayed to the surface of a polymer layer," "the metallic compound or the suspension is applied to the surface of a polymer layer through dipping," or "powder of the metallic compound is applied to the surface of a polymer layer through powdering or spraying." The phrase does not refer to application of a metallic-compound-containing layer through deposition or sputtering.

The metallic-compound-containing layer of the gas-barrier film of the present invention differs in terms of surface roughness from a metallic compound layer of continuous phase which is produced through deposition or sputtering. The metallic-compound-containing layer may have a non-continuous phase or a continuous phase. In the present invention, a metallic-compound-containing layer can be introduced through a convenient process as described below, such as powdering of a metallic compound, or application or spraying of a suspension of the metallic compound. As described above, a metallic-compound-containing layer which contains a heat-resistant resin of high Young's modulus as a plastic film and which is produced through deposition or sputtering, which processes require complicated operation and expensive apparatus, has a mean surface roughness (Ra) of 0.0002–0.002 μm as measured by use of an atomic force microscope (AFM), or an Ra of 0.0001–0.002 μm as calculated through the below-described method making use of a micrograph of transmission electron microscope (TEM). In contrast, in the present invention, a layer containing a metallic compound alone or a layer of a mixture of metallic compound and resin has an Ra of 0.003–0.03 μm as measured by AFM, preferably 0.003–0.02 μm, and an Ra of 0.003–5 μm as calculated by use of a TEM micrograph, more preferably 0.01–3 μm.

In the film of the present invention in which a metallic-compound-containing layer is applied to the surface of a polymer layer formed from a mixture of a poly(meth)acrylic acid polymer and a polyalcohol, a metal invades the polymer layer from the metallic-compound-containing layer. As described below, invasion of a metal can be confirmed by means of energy-dispersive X-ray spectroscopy (EDX). The existence ratio in the polymer layer (the number of counting of metallic atoms/the number of counting of oxygen atoms) is 0.1–20 at a position 0.1 μm deep in a polymer layer from the interface between the polymer layer and a layer containing a metallic compound solely or a layer of a mixture of metallic compound and resin, preferably 0.5–10. When the existence ratio is high, the amount of a metallic compound in a polymer layer is large.

The present invention provides a gas-barrier film which is produced through application of a metallic-compound-containing layer to the surface of a polymer layer, the polymer layer being produced through drying of a mixture of a polyalcohol and at least one poly(meth)acrylic acid polymer selected from the group consisting of poly(meth)acrylic acids and partially neutralized poly(meth)acrylic acids. The present invention also provides a gas-barrier film in which the surface of the polymer layer to which the metallic-compound-containing layer is not applied is fixed onto a substrate layer. In the present invention, in order to impart some degree of water-resistance and gas-barrier properties to the polymer layer, at least the polymer layer is preferably subjected to heat treatment. In addition, the polymer layer must be adjacent to a metallic-compound-containing layer or a layer of a mixture of metallic compound and resin.

[Poly(meth)acrylic acid polymer]

As used herein, the term "poly(meth)acrylic acid polymer" refers to acrylic acid polymers or methacrylic acid polymers containing two or more carboxyl groups, and to carboxylic acid polymers or partially neutralized carboxylic polymers. Specific examples of poly(meth)acrylic acids include a polyacrylic acid, a polymethacrylic acid, a copolymer of acrylic acid and methacrylic acid, and a mixture of two or more species thereof. In the present invention, a copolymer of acrylic acid or methacrylic acid, and a methyl ester or ethyl ester thereof may be employed, so long as the copolymer can be dissolved in a solvent such as water or alcohol, or in a solvent mixture of water and alcohol. Of the aforementioned examples, a homopolymer of acrylic acid or methacrylic acid, or a copolymer of acrylic acid and methacrylic acid is preferable. In consideration of oxygen-gas-barrier properties, a homopolymer of acrylic acid or a copolymer of acrylic acid and methacrylic acid in which the amount of acrylic acid is greater than that of methacrylic acid is more preferable. The number average molecular weight of a poly(meth)acrylic acid polymer is not particularly limited, but in consideration of handling, the number average molecular weight is preferably 1,000–4,000,000, more preferably 2,000–250,000.

Partially neutralized poly(meth)acrylic acid may be produced by partially neutralizing carboxyl groups of poly(meth)acrylic acid with an alkali (i.e., by producing carboxylic acid salts). Examples of alkalis which may be employed include alkali metal hydroxides such as sodium hydroxide, lithium hydroxide, and potassium hydroxide; and ammonium hydroxide. Partially neutralized poly(meth)acrylic acid is typically produced by adding an alkali to an aqueous solution of poly(meth)acrylic acid for reaction between the alkali and the acid. Partially neutralized poly(meth)acrylic acid may be an alkali metal salt or ammonium salt of the acid. Such an alkali metal salt or ammonium salt is contained in a polymer layer as a monovalent metal or an ammonium ion. When partially neutralized poly(meth)acrylic acid is employed, coloring of a polymer layer due to heat may be suppressed. Therefore, partially neutralized poly(meth)acrylic acid is preferably employed in accordance with needs.

The degree of neutralization of partially neutralized poly(meth)acrylic acid may be desirably determined by regulating the ratio of the amount of poly(meth)acrylic acid to that of an alkali. The degree of neutralization of partially neutralized poly(meth)acrylic acid is preferably determined on the basis of oxygen-gas-barrier properties of a produced film. The degree of neutralization may be obtained by use of the following formula: degree of neutralization $(\%)=(N/N_0)\times 100$. In the formula, N represents the amount by mol of neutralized carboxyl groups in 1 g of partially neutralized poly(meth)acrylic acid; and $N_0$ represents the amount by mol of carboxyl groups in 1 g of non-neutralized poly(meth)acrylic acid.

According to Japanese Patent Application Laid-Open (kokai) No. 7-165942, oxygen-gas-barrier properties of a film produced from at least one poly(meth)acrylic acid polymer (A) selected from the group consisting of poly(meth)acrylic acids and partially neutralized poly(meth)acrylic acids and a polyalcohol polymer (B)—the film being employed in a polymer layer of the gas-barrier film of the present invention—are affected by heat treatment conditions during formation of the film, or by the degree of neutralization of the polymer (A) when the mixture ratio of these two polymers is constant. As compared with the case in which poly(meth)acrylic acid is employed as the polymer (A), when neutralized poly(meth)acrylic acid is employed, oxygen-gas-barrier properties of a produced film tend to be enhanced. However, when the degree of neutralization increases, oxygen-gas-barrier characteristic of the produced film tend to deteriorate once it has reached a maximal value (i.e., a minimal value of oxygen permeability). When the degree of neutralization is in excess of 20%, oxygen-gas-barrier properties of a produced film deteriorate as compared with the case in which non-neutralized poly(meth)acrylic acid is employed.

Therefore, from the viewpoint of oxygen-gas-barrier properties, non-neutralized poly(meth)acrylic acid or partially neutralized poly(meth)acrylic acid (the degree of neutralization: 20% or less) is preferably employed as poly (meth)acrylic acid polymer constituting a polymer layer in the gas-barrier film of the present invention. More preferably, non-neutralized poly(meth)acrylic acid or partially neutralized poly(meth)acrylic acid (degree of neutralization: 15% or less) is employed. Much more preferably, partially neutralized poly(meth)acrylic acid (degree of neutralization: 1–13%) is employed.

[Polyalcohol]

As used herein, the term "polyalcohol" refers to low molecular weight compounds containing two or more hydroxyl groups, alcohol polymers, polyvinyl alcohols (PVA), sugars, and starches. Examples of low molecular weight compounds containing two or more hydroxyl groups include glycerin, ethylene glycol, propylene glycol, 1,3-propanediol, pentaerythritol, polyethylene glycol, and polypropylene glycol. PVA which may be employed has a saponification percentage of 95% or more, preferably 98% or more, and has an average degree of polymerization of 300–1,500. In consideration of compatibility with poly (meth)acrylic acid polymer, a vinyl alcohol-poly(meth) acrylic acid copolymer predominantly containing vinyl alcohol may be employed. Sugars which may be employed include monosaccharides, oligosaccharides, and polysaccharides. Such sugars also include sugar alcohols such as sorbitol, mannitol, dulcitol, xylitol, erythritol, and a variety of substitution compounds and derivatives thereof, which are disclosed in Japanese Patent Application Laid-Open (kokai) No. 7-165942. Such sugars preferably have solubility in water, alcohol, or a solvent mixture of water and alcohol.

Starches are a class of polysaccharides. Example of starches which may be employed in the present invention include plant starches (unmodified starches) such as wheat starch, corn starch, glutinous corn starch, potato starch, tapioca starch, rice starch, sweet potato starch, and sago starch; and a variety of modified starches. Examples of modified starches include physically modified starches, enzymatically modified starches, chemical-decomposition modified starches, chemically modified starches, and graft starches which are produced through graft-polymerization of starches and a monomer. Of these starches, water-soluble modified starch which is produced by, for example, hydrolyzing potato starch with an acid is preferable. Sugar alcohol which is produced by substituting an end group (aldehyde group) of starch with a hydroxyl group is more preferable. Starches may be in the form of a hydrate. These starches may be employed singly or in combination of two or more species.

In consideration of production of a polymer layer exhibiting excellent oxygen-gas-barrier properties under high humidity, the mixture ratio (by weight) of poly(meth)acrylic acid polymer to polyalcohol is preferably 99:1–20:80, more preferably 95:5–40:60, much more preferably 95:5–50:50.

Preparation and formation of the polymer layer which is a constituent of the present invention will next be described. A mixture of a poly(meth)acrylic acid polymer and a polyalcohol is prepared through any of the following methods: a method in which each component is dissolved in water; a method in which aqueous solutions of the components are mixed with each other; and a method in which an acrylic acid monomer is polymerized in an aqueous solution of a polyalcohol. When an acrylic acid monomer is polymerized in an aqueous solution of a polyalcohol, if desired, the resultant poly(meth)acrylic acid is neutralized with an alkali. When poly(meth)acrylic acid and, for example, sugar are dissolved in water, an aqueous solution of uniform mixture is obtained. Instead of water, a solvent such as alcohol, or a solvent mixture of water and alcohol may be employed.

When a polymer layer is subjected to heat treatment for imparting water resistance and further enhanced gas-barrier properties to the product, in order to moderate the conditions of the treatment, a water-soluble metallic salt of inorganic or organic acid may appropriately be added to an aqueous solution of a mixture of the above polymers during preparation of the solution. A metal of the salt may be an alkali metal such as lithium, sodium, or potassium. Specific examples of metallic salts of inorganic or organic acid include lithium chloride, sodium chloride, potassium chloride, sodium bromide, sodium phosphite (sodium hypophosphite), disodium hydrogenphosphite, disodium phosphate, sodium ascorbate, sodium acetate, sodium benzoate, and sodium hyposulfite. A phosphine acid metallic salt (hypophosphorous acid metallic salt) which is at least one species selected from among phosphine acid metallic salts (hypophosphorous acid metallic salts) such as sodium phosphite (sodium hypophosphite) and calcium phosphite (calcium hypophosphite) is preferable. The amount of a metallic salt of inorganic or organic acid which is added is preferably 0.1–40 parts by weight on the basis of the solid content of a solution of a mixture of the polymers, more preferably 1–30 parts by weight.

The process for forming a polymer layer from the above-prepared composition is not particularly limited. For example, a polymer layer is obtained through any of the following processes: a solution-cast process in which an aqueous solution of a polymer mixture is applied onto a support (substrate) and dried to form a film; an extrusion process in which an aqueous solution containing a polymer mixture at high concentration is cast through a tiny space by use of an extruder under ejection pressure, and the resultant water-containing film is dried on a rotary drum or belt; and a process in which an aqueous solution containing a polymer mixture at high concentration is applied onto a plastic film, and the film is stretched under heating. Alternatively, when a substrate has a complicated shape, the substrate may be dipped in a solution of a raw material composition, to thereby coat the surface of the substrate with the resultant film. A dried film which is produced as described above will be referred to as "a polymer layer." of the aforementioned processes, a solution-cast process (cast process or coating process) is preferably employed, since a polymer layer (dried film) of excellent transparency can be easily produced.

When a polymer layer is produced through a solution-cast process, the solid content of a solution of the polymer mixture is preferably 1–30 wt. %. When an aqueous solution of a polymer mixture is prepared, if necessary, a solvent other than water, such as alcohol, or a softening agent may appropriately be added to the solution. Alternatively, a plasticizer (excluding a low molecular weight compound containing two or more hydroxyl groups), a heat stabilizer, or an inorganic lamella-structured compound such as smectic ore may be incorporated in advance into at least one of poly(meth)acrylic acid polymer and polyalcohol. The thickness of the polymer layer is appropriately determined in accordance with the purpose of use of a final product. The thickness is not particularly limited, but is preferably 0.01–100 μm, more preferably 0.1–50 μm.

In a coating process, for example, a solution of a mixture of poly(meth)acrylic acid and sugar is applied onto a support (substrate) such as a metallic plate, a glass plate, or a plastic plate so as to attain a desired thickness, by use of an apparatus such as an air knife coater, a kiss roll coater, a metaling bar coater, a gravure roll coater, a reverse roll coater, a dip coater, or a die coater, or by use of a combination thereof. Subsequently, the thus-applied solution is dried by evaporating water through spraying of hot air or radiation of IR rays by use of an apparatus such as an arch drier, a straight bath drier, a tower drier, a floating drier, or a drum drier, or by use of a combination thereof, to thereby form a film (processed-polymer layer).

Subsequently, a layer constituted solely by a metallic compound or a layer of a mixture of metallic compound and resin, serving as a metallic-compound-containing layer, is applied to the surface of a polymer layer which is fixed onto a substrate. Preferred examples of metals constituting a metallic compound include alkali metals such as lithium, sodium, calcium, rubidium, and cesium; alkaline earth metals such as beryllium, magnesium, calcium, strontium, and barium; and transition metals having an oxidation number of +2 such as zinc. Examples of metallic compounds which may be employed include metallic elements; inorganic salts such as oxides, hydroxides, halides, and carbonates; organic salts such as carboxylates and sulfonates; and polyacid salts such as poly(meth)acrylates. Of these, oxides, hydroxides, or carbonates of alkaline earth metal or transition metal having an oxidation number of +2 are preferable. More preferably, in consideration of handling and adhesion to a polymer layer, there is employed at least one metallic compound which is selected from among magnesium oxide, calcium oxide, magnesium hydroxide, calcium hydroxide, zinc oxide, zinc hydroxide, magnesium carbonate, and calcium carbonate. A metallic compound preferably has the form of particles.

The method for application of a metallic-compound-containing layer is not particularly limited, so long as the layer is adjacent to a polymer layer. In the case of application of a layer containing a metallic compound alone, the layer is applied to a polymer layer through, for example, any of the following processes: a process in which a metallic compound is powdered; a process in which a metallic compound is dispersed in a solvent and then the resultant suspension is applied onto a polymer layer by use of a gravure roll coater, a reverse roll coater, a dip coater, or a die coater; and a process in which such a suspension is sprayed to a polymer layer. In the present invention, the thus-applied metallic compound particle layer may have a continuous phase or non-continuous phase.

The solvent for preparing a suspension of metallic compound is not particularly limited, and water, any of a variety of solvents, or solvent mixtures may be employed. In consideration of dispersibility of metallic compound particles, applicability of a suspension of metallic compound, or handling of the suspension, a solvent is arbitrarily chosen from among alcohols, aliphatic hydrocarbons, and aromatic compounds. The solvent is preferably an alcohol having a carbon number of 10 or less. When a layer constituted solely by a metallic compound is employed, the layer is not necessarily applied to the entire surface of a polymer layer as a deposition film is required to do so. The amount of the metallic compound that is applied to the polymer layer is preferably 0.01–20 g/m$^2$, more preferably 0.03–10 g/m$^2$, much more preferably 0.06–5 g/m$^2$. When the amount is in excess of the upper limit of the above range, application cannot be carried out, due to splashing of a metallic compound, whereas when the amount is below the lower limit of the above range, a produced film exhibits insufficient gas-barrier properties.

In the case of application of a layer of a mixture of metallic compound and resin, the layer contains at least one resin which is selected from among an alkyd resin, a melamine resin, an acrylic resin, a urethane resin, nitrocellulose, an epoxy resin, a polyester resin, a phenol resin, an amino resin, a fluorine-containing resin, and isocyanate. The weight ratio of a metallic compound to a resin (i.e., metallic compound/resin) is preferably 0.01–1,000, more preferably 0.01–100. A mixture of a metallic compound and a resin may be dissolved or dispersed in an organic solvent to prepare a dispersion or a suspension, after which the resultant dispersion or suspension is applied or sprayed to a polymer layer. The case in which a mixture of a metallic compound and a resin is employed is more preferable than the case in which a metallic compound is employed alone, since a metallic compound is uniformly applied to a polymer layer when the mixture is employed. In order to prepare a dispersion or a suspension, there may be employed any of the solvents which may be employed in the case in which a metallic compound is solely applied. When a mixture of metallic compound and resin is applied, the amount of the mixture which is applied to a polymer layer may be determined by regulating the amount of a metallic compound being preferably 0.03–20 g/m$^2$, more preferably 0.06–10 g/m$^2$, much more preferably 0.06–5 g/m$^2$.

When a metallic compound is applied through deposition or sputtering, the resultant metallic-compound-applied surface may have a mean surface roughness (Ra) of less than 0.003 μm as measured by AFM or as calculated by use of a TEM micrograph. However, such an application process is disadvantageous, in that a resin employed must have heat resistance and high Young's modulus, and that operation is cumbersome and an expensive apparatus is required, since deposition or sputtering must be carried out in a vacuum apparatus. When the Ra of a metallic-compound-containing layer is in excess of 0.03 μm as measured by AFM or is in excess of 5 μm as calculated by use of a TEM micrograph, adhesion between the metallic-compound-containing layer and a polymer layer is poor, which is not practical. Incidentally, metallic atoms are present in a polymer layer of the gas-carrier film of the present invention in which a metallic-compound-containing layer is applied to the polymer layer produced from a mixture of a poly(meth)acrylic acid polymer and a polyalcohol; or metallic atoms are present in a polymer layer of a laminated gas-barrier film comprising the gas-barrier film and a plastic film laminated thereon. As described below, invasion of a metal into a polymer layer can be confirmed by means of EDX, and the existence ratio in the polymer layer (number of counting of metallic atoms/number of counting of oxygen atoms) is 0.1–20, preferably 0.5–10, at a position 0.1 μm deep in a polymer layer from the interface between the polymer layer and a layer constituted by a metallic compound alone or a layer of a mixture of metallic compound and resin. When the degree is less than 0.1, the polymer layer exhibits insufficient gas-barrier properties, whereas the ratio is in excess of 20, a polymer layer may break, and thus exhibits insufficient gas-barrier properties.

In order to enhance water resistance and gas-barrier properties of a polymer layer which is fixed onto a substrate, at least the polymer layer may be subjected to heat treatment. A polymer layer to which a metallic compound is applied may be subjected to heat treatment under specific conditions, or a metallic compound may be applied to the surface of a polymer layer after the polymer layer is subjected to heat treatment.

As used herein, the term "a polymer layer which is fixed onto a substrate" refers to "a polymer layer, to which a metallic-compound-containing layer is not applied, which is fixed onto a substrate" or "a polymer layer which may be peeled off a substrate." The material of a substrate is not particularly limited, and a metallic plate, a glass plate, or a plastic film may be employed as a substrate. Of these, a plastic film is preferably employed. More preferably, a substrate is chosen from a variety of plastic films in accordance with heat treatment temperature or the intended use of a gas-barrier film (for example, a gas-barrier film is used in sterilization treatment). Examples of materials of plastic film include polyester resins such as polyethylene terephthalate (PET), polybutylene terephthalate (PBT), and polyethylene naphthalate (PEN); polyamides such as nylon 6, nylon 66, nylon 12, a nylon 6'66 copolymer, a nylon 6'12 copolymer, a methaxylylenadipamide nylon 6 copolymer, and amorphous nylon; polyolefins such as low density polyethylene, high density polyethylene, linear low density polyethylene, an ethylene.vinyl acetate copolymer, polypropylene, an ethylene.acrylic acid copolymer, an ethylene.acrylate copolymer, an ethylene.ethyl acrylate copolymer, and poly (methylpentene); polyvinylidene chloride; and polyphenylene sulfide. In order to enhance adhesion between a polymer layer and a substrate layer, an anchoring agent may be applied to the substrate layer.

A polymer layer is subjected to heat treatment under the conditions disclosed in Japanese Patent Application Laid-Open (kokai) No. 8-41218. Specifically, when a sugar is employed as a polyalcohol, a polymer layer is preferably subjected to heat treatment under conditions satisfying the relations between heat treatment temperature and heat treatment time as specified by the following formulas (a) and (b):

(a) $\log t \geq .0.0253 \times T + 11.2$ (b) $373 \leq T \leq 573$

[wherein t represents heat treatment time (minutes), and T represents heat treatment temperature (K)].

When a polymer layer is subjected to heat treatment under the above conditions, the resultant layer has water resistance. In addition, there can be produced a polymer film exhibiting excellent gas-barrier properties; i.e., a polymer layer having a thickness of 2 $\mu$m has an oxygen permeability of $2.0 \times 10^{-12}$ mol/m$^2$·s·Pa (400 cm$^3$/m$^2$·24h·atm) or less as measured at 30° C. and 80% RH.

A polymer layer, such as a polymer film, a laminate comprising a substrate and a film, or a polymer layer to which a metallic-compound-containing layer is applied, may be subjected to heat treatment by placing the layer in an oven, which is then heated at a predetermined temperature for a predetermined time. Alternatively, a polymer layer may be continuously subjected to heat treatment by passing the layer through an oven which is heated at a predetermined temperature within a predetermined time, or by bringing the layer into contact with a heat roll. After completion of heat treatment, the resultant polymer layer has water resistance and exhibits excellent gas-barrier properties under high humidity. In addition, the resultant polymer layer is insoluble in water or boiling water, and has water resistance as specified as follows. As used herein, the phrase "a polymer layer has water resistance" refers to the case in which, when a film comprising a polymer layer is dipped in boiling water for 30 minutes and then dried, the thickness of the polymer layer is 50% or more that of the polymer layer before being dipped in boiling water.

In order to impart strength or sealability to the gas-barrier film of the present invention, a plastic film may further be laminated on the gas-barrier film, to thereby form a laminated gas-barrier film. The type of a laminated gas-barrier film is not particularly limited. Specific examples of layer structures of laminated gas-barrier film include paper/polyethylene terephthalate layer/polymer layer/metallic compound layer/non-stretched polypropylene layer; polyethylene terephthalate layer/polymer layer/metallic compound layer/non-stretched polypropylene layer; polyethylene terephthalate layer/polymer layer/metallic compound layer/linear low density polyethylene layer; polyethylene terephthalate layer/polymer layer/metallic compound layer/ low density polyethylene layer; polyethylene terephthalate layer/polymer layer/metallic compound layer/ethylenic copolymer produced by use of a metallocene catalyst; polyethylene terephthalate layer/polymer layer/metallic compound layer/propylenic copolymer produced by use of a metallocene catalyst; stretched nylon layer/polymer layer/ metallic compound layer/non-stretched polypropylene layer; stretched nylon layer/polymer layer/metallic compound layer/linear low density polyethylene layer; stretched nylon layer/polymer layer/metallic compound layer/low density polyethylene layer; stretched nylon layer/polymer layer/metallic compound layer/ethylenic copolymer produced by use of a metallocene catalyst; and stretched nylon layer/polymer layer/metallic compound layer/propylenic copolymer produced by use of a metallocene catalyst. The aforementioned metallic compound layer may be a layer containing a metallic compound alone or a layer of a mixture of metallic compound and resin.

In order to produce the aforementioned laminated film, a plastic film layer formed of a thermoplastic resin may be laminated on either or both of the surface of a substrate and the surface of a metallic-compound-containing layer, with or without intervention of an adhesive layer, by means of a known lamination method such as coating, dry lamination, or extrusion coating. In dry lamination, a plastic film or sheet formed of a thermoplastic resin is laminated on a metallic-compound-containing layer or on a second surface of a substrate of a gas-barrier film, the gas-barrier film comprising a polymer layer which is fixed onto a first surface of the substrate, and a metallic-compound-containing layer which is applied onto the polymer layer. In extrusion coating, a thermoplastic resin is melt-extruded on a substrate layer or on a metallic compound layer which is applied onto a polymer layer, and a plastic film is laminated thereon, to thereby produce a laminated film.

One of the outer layers of a laminated gas-barrier film is preferably produced from a material which enables heat sealing, high-frequency sealing, or ultrasonic sealing, (i.e., sealant), in consideration of heat adhesion of the films when a bag is produced from the films. Examples of resins which enable heat sealing include polyolefins such as low density polyethylene, linear low density polyethylene, high density polyethylene, an ethylene.vinyl acetate copolymer, an ethylenic copolymer produced by use of a metallocene catalyst, a propylenic copolymer produced by use of a metallocene catalyst, non-stretched polypropylene, an ethylene.acrylic acid copolymer, an ethylene.acrylic acid salt copolymer, and an ethylene.ethyl acrylate copolymer; and nylon copolymers such as a nylon 6'66 copolymer and a nylon 6'12 copolymer. Examples of resins which enable high-frequency sealing include polyvinyl chloride, polyvinylidene chloride, nylon 6, and nylon 66. Examples of types of sealing include four-corner sealing, three-corner sealing, butt sealing, and envelope sealing.

The gas-barrier film of the present invention and the laminated gas-barrier film produced therefrom exhibit excellent oxygen-gas-barrier properties in an atmosphere of high humidity. Therefore, the films are suitably employed for packaging material of beverages or foods susceptible to oxygen, such as furikake (processed seasoning granules), wine, dried bonito, miso, ketchup, and snacks. Particularly, the films are suitably employed for packaging material of foods which undergo sterilization treatment such as retorting or boiling, such as curry, stew, broth, sauce, and corn. The films are employed in the form of, for example, bag, casing, pouch, or capping material.

EXAMPLES

The present invention will next be described in more detail by way of Examples, which should not be construed as limiting the invention thereto.

[Oxygen Permeability]

Oxygen permeability was measured by use of an oxygen permeability measuring instrument (™OX-TRAN2/20, product of Modern Control) at 30° C. and 80% RH. Oxygen permeability of a polymer layer (containing a metallic compound layer) was determined by the following equation:

$$1/P_{total}=1/P_{sample}+1/P_{base}$$

wherein "$P_{total}$" represents a measured value, "$P_{base}$" represents oxygen permeability of a substrate film, and "$P_{sample}$" represents oxygen permeability of a polymer layer (including a layer containing a metallic compound).

[Water Resistance]

A sample film of 10 cm×10 cm, containing a substrate and a polymer layer fixed thereto, was immersed in boiling water for 30 minutes. Thickness of the polymer layer was measured before and after the immersion procedure, and water resistance of the sample was estimated as follows.

When the sample satisfies the relation represented by the following formula:

$$(Ta-Tb)/(Ta-Tc) \leq 0.5,$$

the sample is estimated as water-resistant and rating "O" is assigned. In contrast, when the relation is not satisfied the sample is estimated as non-water-resistant and rating "X" is assigned. In above-described formula, "Ta" (unit: μm) represents the thickness of the sample film before immersion, "Tb" (unit: μm) represents the thickness of the sample film after immersion followed by drying treatment, and "Tc" (unit: μm) represents the thickness of a substrate.

[Mean Surface Roughness (Ra)]

There are two methods for measuring mean surface roughness. A suitable method was employed according to the form of each sample to be measured. When it was possible to expose a surface of metallic compound layer or a surface of layer of a mixture of metallic compound and resin (Examples 1–18 and Comparative Examples 1–10), Ra value was measured by use of an AFM. When it was possible to observe the cross section of a sample as in the case of a laminate, Ra value was measured by use of a TEM. In the latter case, two Ra values were obtained with respect to each sample. One is an Ra value obtained through observation of a cross section of a layer containing a metallic-compound-containing layer applied on a polymer layer, and the other is an Ra value obtained through observation of a cross section of a substrate layer. The higher Ra value thereof was regarded as mean surface roughness.

With respect to Examples 1–18 and Comparative Examples 1–10, the results of AFM measurement are shown in Tables. With respect to Examples 19–58, the results of AFM measurement and TEM measurement are shown in Tables.

Ra value obtained through AFM measurement is mean surface roughness of a metallic compound layer or a layer of a mixture of metallic compound and resin.

Surface roughness of a vapor-deposited layer, a metallic compound layer, or a layer of a mixture of metal compound and resin was measured by use of an AFM (atomic force microscope) of a scanning probe microscope (SP13800D series; product of Seiko Instruments Inc.). The microscope was operated in cyclic contact mode. An area of 2 μm×2 μm was observed at a magnification of 40,000. From the thus-obtained images, ten areas were randomly sampled and Ra (μm) values thereof were averaged.

Ra value obtained thorough TEM measurement is mean surface roughness, which is obtained through observation of a cross section of a laminate.

A laminate film was embedded in epoxy resin and the sample was sliced by use of a cryomicrotome so as obtain an ultra-thin sliced piece. The thus-obtained sliced piece was observed under a TEM at a magnification of 1,400,000 for a vapor-deposited layer and at 40,000 for a metallic compound layer or a layer of a mixture of metallic compound and resin. Each sample was observed before retort treatment.

According to JIS B0601, Ra (μm) of each sample was calculated by use of the thus-obtained images and the following equation:

$$Ra=1/l\int_0^l |f(x)|dx$$

(l: standard length, $\int_0^l$: integral (0 to l)).

The mean line was set at the midpoint of the highest peak and the lowest valley. Observed range with respect to a vapor-deposited layer was 0.06 μm. Observed range with respect to a metallic compound layer or a layer of a mixture of metallic compound and resin was 2.5 μm.

[Existence Ratio of Metallic Compound in a Polymer Layer]

Existence ratio was measured by use of TEM-EDX.

An ultra-thin sliced piece of each sample was irradiated with an electron beam. The species of element and the amount thereof was determined by wavelength of X-rays generated from the piece, to thereby obtain the amount of a metallic atom in a depth direction of a polymer layer. A sample before retort treatment was employed.

Apparatus employed and measuring conditions are as follows.

TEX: Transmission electron microscope (model: HF-2000, product of Hitachi Ltd.)

EDX: Energy-dispersive X-ray spectroscopy (model: VOYAGER III M3100, product of NORAN)

X-ray detector: Si/Li semiconductor detector

Beam size: about 100 mmφ

Measuring time: 50 seconds

Existence ratio of a metal compound was obtained by dividing the number of counting of metallic atoms contained in a polymer layer by the number of counting of oxygen atoms.

Examples 1–3

A 25 wt. % aqueous solution of polyacrylic acid (PAA; product of Toagosei Co., Ltd.; viscosity at 30° C.=8,000–12,000 cps; number-average molecular weight=150,000) was diluted with distilled water to prepare a 15 wt. % aqueous solution. Subsequently, to the thus-prepared PAA aqueous solution, calculated amount of the sodium hydroxide with respect to the number of moles of carboxyl groups of the PAA was added to thereby obtain a partially neutralized PAA aqueous solution having a degree of neutralization of 5%. Subsequently, sodium phosphinate monohydrate (product of Wako Pure Chemical Industries, Ltd.; specialty grade) was added to the partially neutralized PAA aqueous solution so as to obtain a partially neutralized PAA aqueous solution containing sodium phosphinate, wherein the amount of the sodium phosphinate monohydrate added to the partially neutralized PAA aqueous solution was two parts by weight with respect to 100 parts by weight of the solid content of the PAA aqueous solution.

Separately, a 15 wt % aqueous solution of soluble starch (product of Wako Pure Chemical Industries, Ltd.; first grade; hydrolysis product of potato starch with acid) was prepared. The thus-obtained starch aqueous solution and the above-described partially neutralized PAA aqueous solution containing sodium phosphinate were mixed together at various weight ratios, to thereby obtain aqueous solution mixtures (concentration: 15 wt %).

By use of a Mayer bar and a tabletop coater (K303 PROOFER; product of RK Print-Coat Instruments), the thus-obtained aqueous solution was applied onto stretched polyethylene terephthalate film (PET; Lumirror S10; product of Toray Industries, Inc.; thickness–12 $\mu$m) serving as a substrate material. Subsequently, moisture was evaporated by use of a dryer to thereby obtain a dry film having a thickness of 2 $\mu$m.

Magnesium oxide particles (MgO; product of Wako Pure Chemical Industries, Ltd.) having a diameter of 0.01 $\mu$m were suspended in ethyl alcohol(product of Wako Pure Chemical Industries, Ltd.; specialty grade) so as to obtain a MgO/ethyl alcohol suspension having a concentration of 57 g/l. The dry film described above was coated with the thus-obtained suspension in a manner similar to the above-described coating procedure. Subsequently, the stretched PET film bearing the MgO-coated dried film thereon was secured onto cardboard by use of adhesive tape. The thus-obtained sample was heated in a 180° C. oven for 15 minutes. The heat-treated film including an MgO-coated dried film exhibited water resistance as specified in the present invention. Each of the thus-obtained water-resistant films (thickness of the film=2.5 $\mu$m, thickness of the deposited MgO layer=0.5 $\mu$m) was evaluated for water resistance and oxygen permeability. Table 1 shows water resistance, oxygen permeability, coating conditions of metal compound, and heat-treatment conditions with respect to the above-described Examples, other Examples that follow, and Comparative Examples.

Example 4

The procedure described in Example 1 was repeated to thereby obtain a water-resistant film, except that polyvinyl alcohol (PVA) (Poval 105; product of Kuraray Co., Ltd.; degree of polymerization=500; saponification degree $\geqq$98%) was used instead of the soluble starch employed in Examples 1–3 and that the partially neutralized PAA aqueous solution containing sodium phosphinate and the PVA aqueous solution were mixed together at a weight ratio of 70:30, so as to obtain a 15 wt. % solution.

Example 5

The procedure described in Example 1 was repeated to thereby obtain a water-resistant film, except that sugar alcohol (PO20; product of Towa Chemical Industry. Co., Ltd.) was used instead of the soluble starch employed in Examples 1–3 and that the partially neutralized PAA aqueous solution containing sodium phosphinate and the sugar alcohol aqueous solution were mixed together at a weight ratio of 70:30, so as to obtain a 15 wt. % solution.

Examples 6–9

The procedure described in Example 5 was repeated to thereby obtain water-resistant films, except that the follow-ing solvents were used for the preparation of MgO suspension: n-butyl alcohol (product of Wako Pure Chemical Industries, Ltd.; specialty grade; Example 6) as an alcohol; acetic acid (product of Wako Pure Chemical Industries, Ltd.; specialty grade; Example 7) as a carboxylic acid; ethyl acetate (product of Wako Pure Chemical Industries, Ltd.; first grade; Example 8) as an ester; and toluene (product of Wako Pure Chemical Industries, Ltd.; first grade; Example 9) as an aromatic compound.

Examples 10 and 11

The procedure described in Example 2 was repeated to thereby obtain water-resistant films, except that calcium hydroxide (Example 10) or zinc oxide (Example 11) was used instead of the magnesium oxide.

Examples 12 and 13

The procedure described in Example 2 was repeated to thereby obtain water-resistant films, except that stretched nylon film (O-Ny; product of Unitika Ltd.; thickness=15 $\mu$m; Example 12) or non-oriented polypropylene film (CPP) (Torayfan ZK93K; product of Toray Plastic Films Co., Ltd.; thickness=70 $\mu$m; Example 13) was used as a substrate material and that the heat-treatment period was changed shown in Table 1.

Examples 14–18

The procedure described in Example 1 was repeated, except that the conditions shown in Table 1 were employed, to thereby obtain water-resistant films. Briefly, an MgO/ethyl alcohol suspension having a concentration of 27 g/l was sprayed onto a layered product by use of a gardener's sprayer (Example 14); a dried film was heat-treated, followed by application of an MgO/ethyl alcohol suspension thereto by use of a Mayer bar (Example 15); a dried film was heat treated, followed by application of an Mgo/water suspension thereto by use of a Mayer bar (Example 16); powdered MgO was sprayed directly onto a layered product by use of a sprayer (Nikka spray K-III; product of Nikka Ltd.) (Example 17); or a water-resistant film prepared in accordance with the procedure described in Example 1 was rinsed with water for 20 seconds (Example 18).

Comparative Examples 1–10

The procedure described in Examples 1–3 was repeated, except that the conditions shown in Table 1 were employed, to thereby obtain films. The thus-prepared films were evaluated for water resistance, oxygen permeability, and mean surface roughness (Ra), which are shown in Table 1.

TABLE 1-1

| | Substrate | Material of polymer layer Mixing ratio(*1) (by weight) | Heat treatment Temp./Time °C · min. | | Conditions for application of powder | | | | Heat treatment Temp./Time °C · min. | | Post-treatment | Water resistance | Oxygen permeability(*2) | |
|---|---|---|---|---|---|---|---|---|---|---|---|---|---|---|
| | | | | | Method | Type | Solvent | Amount g/m² | | | | | | |
| Ex. 1 | PET | 80/20 | — | — | Mayer bar | MgO | EtOH | 0.06 | 180 | 15 | — | ○ | 0.3 | 0.009 |
| Ex. 2 | " | 70/30 | — | — | Mayer bar | " | " | " | 160 | 30 | — | ○ | 0.4 | 0.009 |
| Ex. 3 | " | 60/40 | — | — | Mayer bar | " | " | " | 180 | 15 | — | ○ | 0.6 | 0.009 |
| Ex. 4 | " | 70/30 | — | — | Mayer bar | " | " | " | " | " | — | ○ | 0.8 | 0.009 |
| Ex. 5 | " | 70/30 | — | — | Mayer bar | " | " | " | " | " | — | ○ | 0.4 | 0.009 |
| Ex. 6 | " | 70/30 | — | — | Mayer bar | " | nBtOH | " | " | " | — | ○ | 0.4 | 0.009 |
| Ex. 7 | " | " | — | — | Mayer bar | " | Acetic acid | " | " | " | — | ○ | 0.4 | 0.009 |
| Ex. 8 | " | " | — | — | Mayer bar | " | Ethyl acetate | " | " | " | — | ○ | 0.4 | 0.009 |
| Ex. 9 | " | " | — | — | Mayer bar | " | Toluene | " | " | " | — | ○ | 0.4 | 0.009 |
| Ex. 10 | " | " | — | — | Mayer bar | Ca(OH)$_2$ | EtOH | " | " | " | — | ○ | 1.0 | 0.015 |
| Ex. 11 | " | " | — | — | Mayer bar | ZnO | " | " | " | " | — | ○ | 1.5 | 0.015 |
| Ex. 12 | O-Ny | " | — | — | Mayer bar | MgO | " | " | 160 | 120 | — | ○ | 0.8 | 0.009 |
| Ex. 13 | CPP | " | — | — | Mayer bar | " | " | " | " | " | — | ○ | 0.8 | 0.009 |
| Ex. 14 | PET | " | — | — | Spray | " | " | 0.20 | 180 | 15 | — | ○ | 0.4 | 0.013 |
| Ex. 15 | " | " | 180 | 15 | Mayer bar | " | " | 0.06 | " | " | — | ○ | 0.3 | 0.009 |
| Ex. 16 | " | " | 180 | 15 | Mayer bar | " | Water | " | — | — | — | ○ | 0.4 | 0.009 |
| Ex. 17 | " | " | — | — | Powdering | " | — | 0.20 | 180 | 15 | — | ○ | 0.6 | 0.012 |
| Ex. 18 | " | " | — | — | Mayer bar | " | EtOH | 0.06 | " | " | Washing | ○ | 0.4 | 0.005 |

(*1)polyacrylic acid/polyalcohol
(*2)Unit (cm³/m² · 24 h · atm), 30° C., 80% RH

TABLE 1-2

| | Substrate | Material of polymer layer Mixing ratio(*1) (by weight) | Heat treatment Temp./Time °C · min. | | Conditions for application of powder | | | | Heat treatment Temp./Time °C · min. | | Post-treatment | Water resistance | Oxygen permeability(*2) | |
|---|---|---|---|---|---|---|---|---|---|---|---|---|---|---|
| | | | | | Method | Type | Solvent | Amount g/m² | | | | | | |
| Comp. Ex. 1 | PET | 80/20 | — | — | — | — | — | — | 180 | 15 | — | ○ | 11.0 | 0.0004 |
| Comp. Ex. 2 | " | 70/30 | — | — | — | — | — | — | " | " | — | ○ | 6.0 | 0.0004 |
| Comp. Ex. 3 | " | 60/40 | — | — | — | — | — | — | " | " | — | ○ | 5.0 | 0.0004 |
| Comp. Ex. 4 | " | 70/30 | — | — | — | — | — | — | 160 | 30 | — | ○ | 8.0 | 0.0004 |
| Comp. Ex. 5 | " | 70/30 | — | — | — | — | — | — | 180 | 15 | — | ○ | 6.0 | 0.0004 |
| Comp. Ex. 6 | " | 70/30 | — | — | Mayer bar | TiO$_2$ | EtOH | 0.06 | " | " | — | ○ | 6.0 | 0.02 |
| Comp. Ex. 7 | " | 70/30 | — | — | Mayer bar | Al(OH)$_3$ | " | " | " | " | — | ○ | 5.0 | 0.02 |
| Comp. Ex. 8 | O-Ny | " | — | — | — | — | — | — | 180 | 15 | — | ○ | 380 | 0.0004 |
| Comp. Ex. 9 | CPP | " | — | — | — | — | — | — | 180 | 15 | — | ○ | 380 | 0.0004 |
| Comp. Ex. 10 | EVOH | 80/20 | — | — | Mayer bar | MgO | EtOH | 0.06 | 180 | 15 | — | ○ | 6.0 | 0.009 |

TABLE 1-2-continued

| | | Material of polymer layer | Heat treatment | Conditions for application of powder | | | Heat treatment | Post- | Water | Oxygen |
|---|---|---|---|---|---|---|---|---|---|---|
| Sub-strate | Mixing ratio[*1] (by weight) | Temp./Time ° C. · min. | | Method | Type | Solvent | Amount g/m² | Temp./Time ° C. · min. | treat-ment | resis-tance | permea-bility[*2] |

[*1]polyacrylic acid/polyalcohol
[*2]Unit (cm³/m² · 24 h · atm), 30° C., 80% RH

Concerning Examples 19–58, procedures are basically the same as that described in Examples 1–18 except that the following conditions were employed. An adhesive agent (TM-590; product of Toyo Morton Ltd.) and a curing agent (CAT-56A; product of Toyo Morton Ltd.) were applied onto the MgO side of a MgO-coated film. The thickness of the adhesive agent was 3 μm. Subsequently, a non-oriented polypropylene film (CPP) (Torayfan ZK93K; product of Toray Plastic Films Co., Ltd.; thickness=70 μm) was attached to the side to which an adhesive agent and a curing agent had been applied. The thus-obtained layered film was dry-laminated. Each of the thus-obtained films was treated in water under high pressure and heat by use of an autoclave (BS-325; product of Tomy Kogyo Co., Ltd.) at 120° C. for 20 minutes.

Example 19

The procedure described in Example 1 was repeated, except that the following conditions were employed. PO20 (product of Towa Chemical Industry. Co., Ltd.) was used instead of the soluble starch used in Example 1; the partially neutralized PAA aqueous solution containing sodium phosphinate and the PO20 aqueous solution were mixed together at a weight ratio of 90:10 instead of 80:20; and a sample was heat-treated by hot air at 230° C. for 30 seconds instead of being heat-treated in a geared oven at 180° C. for 15 minutes. The thus-obtained film was treated under high pressure and heat at 120° C. for 20 minutes.

Example 20

The procedure described in Example 19 was repeated, except that the partially neutralized PAA aqueous solution containing sodium phosphinate and the PO20 aqueous solution were mixed together at a weight ratio of 80:20 instead of 90:10.

Example 21

The procedure described in Example 19 was repeated, except that the partially neutralized PAA aqueous solution containing sodium phosphinate and the PO20 aqueous solution were mixed together at a weight ratio of 70:30 instead of 90:10.

Example 22

The procedure described in Example 19 was repeated, except that the partially neutralized PAA aqueous solution containing sodium phosphinate and the PO20 aqueous solution were mixed together at a weight ratio of 60:40 instead of 90:10.

Example 23

The procedure described in Example 21 was repeated, except that the polyvinyl alcohol (PVA) used in Example 4 was used instead of PO20.

Example 24

The procedure described in Example 20 was repeated, except that a soluble starch (product of Wako Pure Chemical Industries, Ltd.; first grade) as polyalcohol was used instead of PO20.

Example 25

The procedure described in Example 20 was repeated, except that sorbitol (product of Wako Pure Chemical Industries, Ltd.) as polyalcohol was used instead of PO20.

Example 26

The procedure described in Example 22 was repeated, except that glycerin (product of Wako Pure Chemical Industries, Ltd.; first grade) as polyalcohol was used instead of PO20.

Example 27

The procedure described in Example 20 was repeated, except that the heat-treatment was performed after dried film prepared from PO20 and the partially neutralized PAA containing sodium phosphinate was coated with the MgO suspension in ethyl alcohol, instead of the heat-treatment being performed before MgO-coating procedure.

Example 28

The procedure described in Example 21 was repeated, except that the heat-treatment was performed at 160° C. for 15 minutes in a geared oven.

Example 29

The procedure described in Example 26 was repeated, except that the heat-treatment was performed at 160° C. for 15 minutes in a geared oven.

Example 30

The procedure described in Example 20 was repeated, except that magnesium hydroxide, $Mg(OH)_2$, (product of Wako Pure Chemical Industries, Ltd.) was used instead of MgO.

Example 31

The procedure described in Example 20 was repeated, except that calcium hydroxide, $Ca(OH)_2$, (product of Wako Pure Chemical Industries, Ltd.) was used instead of MgO.

Example 32

The procedure described in Example 20 was repeated, except that zinc oxide, ZnO, having a particle size of 0.02 μm (product of Wako Pure Chemical Industries, Ltd.) was used instead of MgO.

Example 33

The procedure described in Example 20 was repeated, except that the following conditions were employed. The mixture of the aqueous solution of partially neutralized PAA containing sodium phosphinate and the PO20 aqueous solution was applied to a biaxially stretched nylon film (nylon 6; product of Unitika Ltd.; Emblem; thickness=15 μm) instead of the PET film, and heat-treatment was performed by use of hot air at 180° C. for 30 seconds.

Example 34

The procedure described in Example 20 was repeated, except that the aqueous solution of partially neutralized PAA containing sodium phosphinate and the PO20 aqueous solution was applied so as to obtain a polymer layer having a thickness of 1 μm instead of 2 μm.

Example 35

The procedure described in Example 20 was repeated, except that a Mgo/ethyl alcohol suspension having a concentration of 5 g/l was used instead of the suspension having a concentration of 57 g/l.

Example 36

The procedure described in Example 20 was repeated, except that a mixed solution containing MgO and a resin component, instead of the MgO/ethyl alcohol suspension, was applied to a polymer layer containing the partially neutralized PAA containing sodium phosphinate and PO20.

The mixed solution containing MgO and a resin component was prepared as follows. Polyester resin (AD335AE; product of Toyo Morton Ltd.) as a resin component and isocyanate (CAT-1; product of Toyo Morton Ltd.) as a curing agent were mixed in a ratio of 10:1. Subsequently, the thus-obtained resin mixture was diluted with a mixed solvent of toluene and ethyl acetate (weight ratio of 1/1) so as to obtain a resin solution having a nonvolatile content of 10 wt. %. Subsequently, the thus-obtained solution was mixed with MgO, which is the same species as used in Example 2, to thereby obtain a solution. The MgO was mixed so that the weight ratio of MgO/resin was 1/1. The resultant solution was applied to a polymer layer so as to have a thickness of 0.2 μm. The thus-obtained laminated film was conditioned at 40° C. and 80% RH for three days.

Example 37

The procedure described in Example 36 was repeated, except that the resin solution was mixed with MgO to thereby obtain a solution, in which the weight ratio of MgO/resin is 0.5/1 instead of 1/1.

Example 38

The procedure described in Example 36 was repeated, except that the following conditions were employed. Polyester resin (TM-225AE; product of Toyo Morton Ltd.) as a resin component and isocyanate (TM-225B; product of Toyo Morton Ltd.) as a curing agent were used instead of the resin component (AD-335AE; product of Toyo Morton Ltd.) and isocyanate (CAT-10; product of Toyo Morton Ltd.); the polyester resin and the curing agent were mixed in a ratio of 16:1; and the thus-obtained resin mixture was diluted with ethyl acetate so as to obtain a resin solution having a nonvolatile content of 10 wt. %.

Example 39

The procedure described in Example 38 was repeated, except that the resin solution was mixed with MgO to thereby obtain a solution, in which the weight ratio of MgO/resin was 0.5/1 instead of 1/1.

Example 40

The procedure described in Example 36 was repeated, except that the following conditions were employed. Polyvinyl alcohol (PVA) used in Example 4 was employed instead of the PO20 as a polyalcohol component; and the partially neutralized PAA containing sodium phosphinate and the PVA were mixed together at a weight ratio of 70:30.

Example 41

The procedure described in Example 36 was repeated, except that the following conditions were employed. A soluble starch used in Example 1 was employed instead of the PO20 as a polyalcohol component; and the partially neutralized PAA containing sodium phosphinate and the PVA were mixed together at a weight ratio of 80:20.

Example 42

The procedure described in Example 36 was repeated, except that the following conditions were employed. Sorbitol used in Example 25 was employed instead of the PO20 as a polyalcohol component; and the partially neutralized PAA containing sodium phosphinate and the PVA were mixed together at a weight ratio of 80:20.

Example 43

The procedure described in Example 36 was repeated, except that the following conditions were employed. Glycerin used in Example 26 was employed instead of the PO20 as a polyalcohol component; and the partially neutralized PAA containing sodium phosphinate and the glycerin were mixed together at a weight ratio of 60:40.

Example 44

The procedure described in Example 36 was repeated, except that the following conditions were employed. 100 parts by weight of a transparent UV shielding dispersion (ZR-133; product of Sumitomo Osaka Cement Co., Ltd.), in which zinc oxide fine particles were dispersed in polyester resin at a weight ratio of 1.5/1 (metal compound/resin), was mixed with 4 parts by weight of a curing agent (DN-980; product of Dainippon Ink and Chemical Inc.); the thus-obtained mixture was diluted with a solvent mixture of toluene and methyl ethyl ketone (weight ratio=6/4) so as to obtain a zinc-oxide-containing resin solution having a desired nonvolatile content; the resultant solution was applied to a polymer layer so as to have a thickness of 0.2 μm.

Example 45

The procedure described in Example 44 was repeated, except that the zinc oxide-containing resin solution was applied to a polymer layer so as to have a thickness of 0.1 μm instead of 0.2 μm.

Example 46

The procedure described in Example 44 was repeated, except that the zinc oxide-containing resin solution was applied to a polymer layer so as to have a thickness of 0.9 μm instead of 0.2 μm.

Example 47

The procedure described in Example 44 was repeated, except that the following conditions were employed. A biaxially stretched nylon film used in Example 12 was employed instead of the PET film as a substrate; and heat-treatment was performed by use of hot air at 180° C. for 15 minutes instead of heat-treatment in a geared oven.

Examples 48–50

The procedure described in Example 44 was repeated, except that the partially neutralized PAA containing sodium phosphinate and the PO20 were mixed together at a weight ratio of 90:10 (Example 48); 70:30 (Example 49); and 60:40 (Example 50) instead of 80:20.

Example 51

The procedure described in Example 44 was repeated, except that a thickness of the polymer layer formed of a partially neutralized PAA containing sodium phosphinate and the PO20 was changed to 1 μm instead of 2 μm.

Example 52

The procedure described in Example 44 was repeated, except that a polymer layer containing the partially neutralized PAA containing sodium phosphinate and PO20 was heat-treated in a geared oven at 160° C. for 15 minutes.

Example 53

The procedure described in Example 44 was repeated, except that a polymer layer containing the partially neutralized PAA containing sodium phosphinate and glycerin in a ratio of 60:40 was heat-treated in a geared oven at 160° C. for 15 minutes.

Example 54

The procedure described in Example 36 was repeated, except that magnesium hydroxide (product of Wako Pure Chemical Industries, Ltd.) was used instead of magnesium oxide.

Example 55

The procedure described in Example 36 was repeated, except that calcium hydroxide (product of Wako Pure Chemical Industries, Ltd.) was used instead of magnesium oxide.

Example 56

The procedure described in Example 44 was repeated, except that a CPP film was laminated to the PET film side to which an adhesive agent had been applied previously, instead of being laminated to the metal compound side with intervention of an adhesive agent.

Example 57

The procedure described in Example 44 was repeated, except that a biaxially stretched polyethylene terephthalate film (S10; product of Toray Industries, Inc.; thickness=25 μm) instead of a CPP film was laminated to the metal compound side to which an adhesive agent had been applied previously.

Example 58

The procedure described in Example 20 was repeated, except that the resin solution containing polyester resin AD335AE and isocyanate CAT-10 as described in Example 36 was applied to a MgO-coated surface.

Comparative Example 11

The procedure described in Example 19 was repeated, except that the Mgo/ethyl alcohol suspension was not applied to a dried film.

Comparative Example 12

The procedure described in Example 20 was repeated, except that the MgO/ethyl alcohol suspension was not applied to a dried film.

Comparative Example 13

The procedure described in Example 21 was repeated, except that the MgO/ethyl alcohol suspension was not applied to a dried film.

Comparative Example 14

The procedure described in Example 22 was repeated, except that the MgO/ethyl alcohol suspension was not applied to a dried film.

Comparative Example 15

The procedure described in Example 25 was repeated, except that the MgO/ethyl alcohol suspension was not applied to a dried film.

Comparative Example 16

The procedure described in Example 26 was repeated, except that the MgO/ethyl alcohol suspension was not applied to a dried film.

Comparative Example 17

The procedure described in Example 24 was repeated, except that the MgO/ethyl alcohol suspension was not applied to a dried film.

Comparative Example 18

The procedure described in Example 23 was repeated, except that the MgO/ethyl alcohol suspension was not applied to a dried film.

Comparative Example 19

The procedure described in Example 28 was repeated, except that the MgO/ethyl alcohol suspension was not applied to a dried film.

Comparative Example 20

The procedure described in Example 29 was repeated, except that the MgO/ethyl alcohol suspension was not applied to a dried film.

Comparative Example 21

The procedure described in Example 33 was repeated, except that the Mgo/ethyl alcohol suspension was not applied to a dried film.

Comparative Example 22

The mixed solution containing AD-335AE and MgO as described in Example 36 was applied to a saponified ethylene-vinyl alcohol copolymer film (Eval EP-F; product of Kraray Co., Ltd; thickness=15 μm). The Eval layer was analyzed for the amount of zinc atoms by use of a TEM- EDX, although a processed-polymer layer comprising the partially neutralized PAA containing sodium phosphinate and polyvinyl alcohol was analyzed for amount of zinc atoms by use of a TEM-EDX in other Examples.

Comparative Example 23

The procedure described in Comparative Example 22 was repeated, except that the MgO/ethyl alcohol suspension as described in Example 1 was used instead of the mixed solution containing the AD-335AE and MgO. The Eval layer was analyzed, for the amount of zinc atoms by use of a TEM-EDX, although a processed-polymer layer comprising the partially neutralized PAA containing sodium phosphinate and polyvinyl alcohol was analyzed for the amount of zinc atoms by use of a TEM-EDX in other Examples.

Comparative Example 24

The procedure described in Example 20 was repeated, except that the MgO/ethyl alcohol suspension was applied to a PET film side instead of the polymer layer, the layer being formed of the partially neutralized PAA containing sodium phosphinate and PO20.

Comparative Example 25

The procedure described in Example 19 was repeated, except that the following conditions were employed. A vapor-deposited MOS-TO film (product of Oike Industrial Co., Ltd.) was used instead of the PET film; and the application of the partially neutralized PAA containing sodium phosphinate and the PO20 to the deposited MOS-TO film was not performed.

The fabrication conditions and the structure of the laminated films described in Examples 19–40 are shown in Table 2. The fabrication conditions and the structure of the laminated films described in Examples 41–58 are shown in Table 3. The fabrication conditions of the laminated films described in Comparative Examples 11–25 are shown in Table 4. Characteristics of the laminated films are shown in Table 5 (Examples 19–50) and in Table 6 (Examples 51–58 and Comparative Examples 11–25).

TABLE 2

| | ① Sub-strate | Pal*1 | ② polymer layer | | | ③ Metal compound/ Mixture of metal-compound & resin | | | | ④ Lami-nate | Layer struc-ture |
| | | | Mixing Ratio (*7) | Thick-ness μm | Heat treatment conditions*4 | Metal compound | Resin | Metal compound/ Resin | Amount of appli-cation*6 | | |
|---|---|---|---|---|---|---|---|---|---|---|---|
| Ex. 19 | PET | PO20 | 90/10 | 2 | Pre: 230° C. 30 sec. | MgO | — | — | 0.7 g/m² | CPP | ①②③④ |
| Ex. 20 | PET | PO20 | 80/20 | 2 | Pre: 230° C. 30 sec. | MgO | — | — | 0.7 g/m² | CPP | ①②③④ |
| Ex. 21 | PET | PO20 | 70/30 | 2 | Pre: 230° C. 30 sec. | MgO | — | — | 0.7 g/m² | CPP | ①②③④ |
| Ex. 22 | PET | PO20 | 60/40 | 2 | Pre: 230° C. 30 sec. | MgO | — | — | 0.7 g/m² | CPP | ①②③④ |
| Ex. 23 | PET | PVA | 70/30 | 2 | Pre: 230° C. 30 sec. | MgO | — | — | 0.7 g/m² | CPP | ①②③④ |
| Ex. 24 | PET | Soluble starch | 80/20 | 2 | Pre: 230° C. 30 sec. | MgO | — | — | 0.7 g/m² | CPP | ①②③④ |
| Ex. 25 | PET | Sorbitol | 80/20 | 2 | Pre: 230° C. 30 sec. | MgO | — | — | 0.7 g/m² | CPP | ①②③④ |
| Ex. 26 | PET | Glycerin | 60/40 | 2 | Pre: 230° C. 30 sec. | MgO | — | — | 0.7 g/m² | CPP | ①②③④ |
| Ex. 27 | PET | PO20 | 80/20 | 2 | Post: 230° C. 30 sec. | MgO | — | — | 0.7 g/m² | CPP | ①②③④ |
| Ex. 28 | PET | PO20 | 70/30 | 2 | Pre: 160° C. 15 min. | MgO | — | — | 0.7 g/m² | CPP | ①②③④ |
| Ex. 29 | PET | Glycerin | 60/40 | 2 | Pre: 160° C. 15 min. | MgO | — | — | 0.7 g/m² | CPP | ①②③④ |
| Ex. 30 | PET | PO20 | 80/20 | 2 | Pre: 230° C. 30 sec. | Mg(OH)$_2$ | — | — | 0.7 g/m² | CPP | ①②③④ |
| Ex. 31 | PET | PO20 | 80/20 | 2 | Pre: 230° C. 30 sec. | Ca(OH)$_2$ | — | — | 0.7 g/m² | CPP | ①②③④ |
| Ex. 32 | PET | PO20 | 80/20 | 2 | Pre: 230° C. 30 sec. | ZnO | — | — | 0.7 g/m² | CPP | ①②③④ |
| Ex. 33 | O-Ny | PO20 | 80/20 | 2 | Pre: 180° C. 30 sec. | MgO | — | — | 0.7 g/m² | CPP | ①②③④ |
| Ex. 34 | PET | PO20 | 80/20 | 1 | Pre: 230° C. 30 sec. | MgO | — | — | 0.7 g/m² | CPP | ①②③④ |
| Ex. 35 | PET | PO20 | 80/20 | 2 | Pre: 230° C. 30 sec. | MgO | — | — | 0.06 g/m² | CPP | ①②③④ |
| Ex. 36 | PET | PO20 | 80/20 | 2 | Pre: 230° C. 30 sec. | MgO | P*2 | 1/1 | 0.2 μm | CPP | ①②③④ |
| Ex. 37 | PET | PO20 | 80/20 | 2 | Pre: 230° C. 30 sec. | MgO | P*2 | 0.5/1 | 0.2 μm | CPP | ①②③④ |
| Ex. 38 | PET | PO20 | 80/20 | 2 | Pre: 230° C. 30 sec. | MgO | P*3 | 1/1 | 0.2 μm | CPP | ①②③④ |
| Ex. 39 | PET | PO20 | 80/20 | 2 | Pre: 230° C. 30 sec. | MgO | P*3 | 0.5/1 | 0.2 μm | CPP | ①②③④ |
| Ex. 40 | PET | PVA | 70/30 | 2 | Pre: 230° C. 30 sec. | MgO | P*2 | 1/1 | 0.2 μm | CPP | ①②③④ |

Pal*1: Polyalcohol, P*2: AD335-AE (polyester-type), P*3: TM-225AE (polyester-type),
*4: In Examples 19–27 and 30–40, heat treatment was performed by use of hot-air; and in Examples 28 and 29, heat treatment was performed in a geared oven.
In the column of "heat treatment conditions," the symbol "Pre" refers to the case in which a polymer layer is heat-treated before application of a metallic compound, and the symbol "Post" refers to the case in which a polymer layer is heat-treated after application of a metallic compound.
P*5: ZR-133 (polyester-type)
*6: The unit "g/m²" refers to the amount of application, and the unit "μm" refers to the thickness of application.
(*7): poly acrylic acid/polyalcohol

TABLE 3

| | ① Sub-strate | Pal*1 | ② polymer layer | | | ③ Metal compound/ Mixture of metal-compound & resin | | | | ④ Lami-nate | Layer struc-ture |
| | | | Mixing Ratio (*7) | Thick-ness μm | Heat treatment conditions*4 | Metal com-pound | Resin | Metal compound/ Resin | Amount of application*6 thickness | | |
|---|---|---|---|---|---|---|---|---|---|---|---|
| Ex. 41 | PET | Soluble starch | 80/20 | 2 | Pre: 230° C. 30 sec. | MgO | P*2 | 1/1 | 0.2 μm | CPP | ①②③④ |

TABLE 3-continued

| | ① Substrate | Pal*1 | ② polymer layer Mixing Ratio (*7) | Thickness μm | Heat treatment conditions*4 | ③ Metal compound/Mixture of metal-compound & resin Metal compound | Resin | Metal compound/Resin | Amount of application*6 thickness | ④ Laminate | Layer structure |
|---|---|---|---|---|---|---|---|---|---|---|---|
| Ex. 42 | PET | Sorbitol | 80/20 | 2 | Pre: 230° C. 30 sec. | MgO | P*2 | 1/1 | 0.2 μm | CPP | ①②③④ |
| Ex. 43 | PET | Glycerin | 60/40 | 2 | Pre: 230° C. 30 sec. | MgO | P*2 | 1/1 | 0.2 μm | CPP | ①②③④ |
| Ex. 44 | PET | PO20 | 80/20 | 2 | Pre: 230° C. 30 sec. | ZnO | P*5 | 1.5/1 | 0.2 μm | CPP | ①②③④ |
| Ex. 45 | PET | PO20 | 80/20 | 2 | Pre: 230° C. 30 sec. | ZnO | P*5 | 1.5/1 | 0.1 μm | CPP | ①②③④ |
| Ex. 46 | PET | PO20 | 80/20 | 2 | Pre: 230° C. 30 sec. | ZnO | P*5 | 1.5/1 | 0.9 μm | CPP | ①②③④ |
| Ex. 47 | O-Ny | PO20 | 80/20 | 2 | Pre: 180° C. 15 min. | ZnO | P*5 | 1.5/1 | 0.2 μm | CPP | ①②③④ |
| Ex. 48 | PET | PO20 | 90/10 | 2 | Pre: 230° C. 30 sec. | ZnO | P*5 | 1.5/1 | 0.2 μm | CPP | ①②③④ |
| Ex. 49 | PET | PO20 | 70/30 | 2 | Pre: 230° C. 30 sec. | ZnO | P*5 | 1.5/1 | 0.2 μm | CPP | ①②③④ |
| Ex. 50 | PET | PO20 | 60/40 | 2 | Pre: 230° C. 30 sec. | ZnO | P*5 | 1.5/1 | 0.2 μm | CPP | ①②③④ |
| Ex. 51 | PET | PO20 | 80/20 | 1 | Pre: 230° C. 30 sec. | ZnO | P*5 | 1.5/1 | 0.2 μm | CPP | ①②③④ |
| Ex. 52 | PET | PO20 | 80/20 | 2 | Pre: 160° C. 15 min. | ZnO | P*5 | 1.5/1 | 0.2 μm | CPP | ①②③④ |
| Ex. 53 | PET | Glycerin | 60/40 | 2 | Pre: 160° C. 15 min. | ZnO | P*5 | 1.5/1 | 0.2 μm | CPP | ①②③④ |
| Ex. 54 | PET | PO20 | 80/20 | 2 | Pre: 230° C. 30 sec. | Mg(OH)₂ | P*2 | 1/1 | 0.2 μm | CPP | ①②③④ |
| Ex. 55 | PET | PO20 | 80/20 | 2 | Pre: 230° C. 30 sec. | Ca(OH)₂ | P*2 | 1/1 | 0.2 μm | CPP | ④①②③ |
| Ex. 56 | PET | PO20 | 80/20 | 2 | Pre: 230° C. 30 sec. | ZnO | P*5 | 1.5/1 | 0.2 μm | CPP | ①②③④ |
| Ex. 57 | PET | PO20 | 80/20 | 2 | Pre: 230° C. 30 sec. | ZnO | P*5 | 1.5/1 | 0.2 μm | PET | ①②③④ |
| Ex. 58 | PET | PO20 | 80/20 | 2 | Pre: 230° C. 30 sec. | Application of MgO (0.7 g/m²) before application of P*2 (0.2 μm) | | | | CPP | ①②③④ |

Pal*1: Polyalcohol, P*2: AD335-AE (polyester-type), P*3: TM-225AE (polyester-type),
*4: In Examples 19–27 and 30–40, heat treatment was performed by use of hot-air; and in Examples 28 and 29, heat treatment was performed in a geared oven.
In the column of "heat treatment conditions," the symbol "Pre" refers to the case in which a polymer layer is heat-treated before application of a metallic compound, and the symbol "Post" refers to the case in which a polymer layer is heat-treated after application of a metallic compound.
P*5: ZR-133 (polyester-type)
*6: The unit "g/m²" refers to the amount of application, and the unit "μm" refers to the thickness of application.
(*7): poly acrylic acid/polyalcohol

TABLE 4

| | ① Substrate | Pal*1 | ② polymer layer PAA content % | Thickness μm | Heat treatment conditions*4 | ③ Metal compound/Mixture of metal-compound & resin Metal compound | Resin | Metal compound/Resin | Amount of application*6 | ④ Laminate | Layer structure |
|---|---|---|---|---|---|---|---|---|---|---|---|
| Co. Ex. 11 | PET | PO20 | 90 | 2 | Pre: 230° C. 30 sec. | — | — | — | — | CPP | ①②④ |
| Co. Ex. 12 | PET | PO20 | 80 | 2 | Pre: 230° C. 30 sec. | — | — | — | — | CPP | ①②④ |
| Co. Ex. 13 | PET | PO20 | 70 | 2 | Pre: 230° C. 30 sec. | — | — | — | — | CPP | ①②④ |
| Co. Ex. 14 | PET | PO20 | 60 | 2 | Pre: 230° C. 30 sec. | — | — | — | — | CPP | ①②④ |
| Co. Ex. 15 | PET | Sorbitol | 80 | 2 | Pre: 230° C. 30 sec. | — | — | — | — | CPP | ①②④ |
| Co. Ex. 16 | PET | Glycerin | 60 | 2 | Pre: 230° C. 30 sec. | — | — | — | — | CPP | ①②④ |
| Co. Ex. 17 | PET | Soluble starch | 80 | 2 | Pre: 230° C. 30 sec. | — | — | — | — | CPP | ①②④ |
| Co. Ex. 18 | PET | PVA | 70 | 2 | Pre: 230° C. 30 sec. | — | — | — | — | CPP | ①②④ |
| Co. Ex. 19 | PET | PO20 | 70 | 2 | Pre: 160° C. 15 min. | — | — | — | — | CPP | ①②④ |
| Co. Ex. 20 | PET | Glycerin | 60 | 2 | Pre: 160° C. 15 min. | — | — | — | — | CPP | ①②④ |
| Co. Ex. 21 | O-Ny | PO20 | 80 | 2 | Pre: 180° C. 15 min. | — | — | — | — | CPP | ①②④ |
| Co. Ex. 22 | EVOH | — | — | — | — | ZnO | P*5 | 1.5/1 | 0.2 μm | CPP | ①③④ |
| Co. Ex. 23 | EVOH | — | — | — | — | MgO | — | — | 0.7 g/m² | CPP | ①③④ |
| Co. Ex. 24 | PET | PO20 | 80 | 2 | Pre: 230° C. 30 sec. | MgO | — | — | — | CPP | ③①② |
| Co. Ex. 25 | PET | — | — | — | — | SiOx | — | — | — | CPP | ①②④ |

Pal*1: Polyalcohol, P*2: AD335-AE (polyester-type), P*3: TM-225AE (polyester-type),
*4: In Examples 19–27 and 30–40, heat treatment was performed by use of hot-air; and in Examples 28 and 29, heat treatment was performed in a geared oven.

TABLE 4-continued

| | | (2) polymer layer | | | (3) Metal compound/ Mixture of metal-compound & resin | | | | |
|---|---|---|---|---|---|---|---|---|---|
| (1) Substrate | Pal*1 | PAA content % | Thickness μm | Heat treatment conditions*4 | Metal compound | Resin | Metal compound/ Resin | Amount of application*6 | (4) Laminate | Layer structure |

In the column of "heat treatment conditions," the symbol "Pre" refers to the case in which a polymer layer is heat-treated before application of a metallic compound, and the symbol "Post" refers to the case in which a polymer layer is heat-treated after application of a metallic compound.
P*5: ZR-133 (polyester-type)
*6: The unit "g/m$^2$" refers to the amount of application, and the unit "μm" refers to the thickness of application.
(*7): poly acrylic acid/polyalcohol

TABLE 5

| | Oxygen Permeability | | Water resistance | Ra (μm) | | Existence ratio of metal compound |
|---|---|---|---|---|---|---|
| | Pre*8 | Post*9 | | AFM | TEM | |
| Ex. 19 | 0.2 | 0.2 | O | 0.015 | 0.06 | 1.56 |
| Ex. 20 | <0.1 | <0.1 | O | 0.015 | 0.06 | 1.56 |
| Ex. 21 | 0.2 | <0.1 | O | 0.015 | 0.06 | 1.56 |
| Ex. 22 | <0.1 | 0.4 | O | 0.015 | 0.06 | 1.56 |
| Ex. 23 | 0.2 | 0.2 | O | 0.015 | 0.06 | 1.56 |
| Ex. 24 | 0.2 | <0.1 | O | 0.015 | 0.06 | 1.56 |
| Ex. 25 | 0.1 | 0.1 | O | 0.015 | 0.06 | 1.56 |
| Ex. 26 | 0.2 | 0.5 | O | 0.015 | 0.06 | 1.56 |
| Ex. 27 | <0.1 | <0.1 | O | 0.015 | 0.06 | 1.56 |
| Ex. 28 | 0.6 | 3.9 | O | 0.015 | 0.06 | 2.50 |
| Ex. 29 | 0.1 | 0.2 | O | 0.015 | 0.06 | 2.50 |
| Ex. 30 | 0.4 | 0.9 | O | 0.019 | 0.06 | 1.56 |
| Ex. 31 | 1.0 | 0.9 | O | 0.019 | 0.06 | 1.56 |
| Ex. 32 | 0.9 | 0.2 | O | 0.019 | 0.06 | 1.56 |
| Ex. 33 | 4.3 | <0.1 | O | 0.015 | 0.06 | 2.50 |
| Ex. 34 | <0.1 | <0.1 | O | 0.015 | 0.06 | 1.56 |
| Ex. 35 | 1.4 | 3 | O | 0.015 | 0.06 | 1.56 |
| Ex. 36 | <0.1 | <0.1 | O | 0.003 | 0.02 | 1.56 |
| Ex. 37 | <0.1 | 1.2 | O | 0.003 | 0.02 | 1.56 |
| Ex. 38 | <0.1 | 0.2 | O | 0.003 | 0.02 | 1.56 |
| Ex. 39 | <0.1 | <0.1 | O | 0.003 | 0.02 | 1.56 |
| Ex. 40 | 0.2 | 0.2 | O | 0.003 | 0.02 | 1.56 |
| Ex. 41 | <0.1 | <0.1 | O | 0.003 | 0.02 | 1.56 |
| Ex. 42 | <0.1 | 3.5 | O | 0.003 | 0.02 | 1.56 |
| Ex. 43 | 0.2 | 0.5 | O | 0.003 | 0.02 | 1.56 |
| Ex. 44 | 0.3 | 0.1 | O | 0.003 | 0.02 | 1.56 |
| Ex. 45 | 0.3 | 0.1 | O | 0.003 | 0.02 | 1.56 |
| Ex. 46 | 0.4 | 0.1 | O | 0.003 | 0.02 | 1.56 |
| Ex. 47 | 4.3 | <0.1 | O | 0.003 | 0.02 | 2.50 |
| Ex. 48 | 0.5 | 0.1 | O | 0.003 | 0.02 | 1.56 |
| Ex. 49 | 0.3 | 0.1 | O | 0.003 | 0.02 | 1.56 |
| Ex. 50 | 0.3 | 0.2 | O | 0.003 | 0.02 | 1.56 |

Pre *8): Measurement before retort treatment
Post *9): Measurement after retort treatment

TABLE 6

| | Oxygen Permeability | | Water resistance | Ra (μm) | | Existence ratio of metal compound |
|---|---|---|---|---|---|---|
| | Pre*8 | Post*9 | | AFM | TEM | |
| Ex. 51 | 0.3 | 0.1 | O | 0.003 | 0.02 | 1.56 |
| Ex. 52 | 0.6 | 4.0 | O | 0.003 | 0.02 | 2.50 |
| Ex. 53 | 0.2 | 0.2 | O | 0.003 | 0.02 | 2.50 |
| Ex. 54 | 0.4 | 0.9 | O | 0.004 | 0.02 | 1.56 |
| Ex. 55 | 0.5 | 1.0 | O | 0.004 | 0.02 | 1.56 |
| Ex. 56 | 0.3 | 1.0 | O | 0.003 | 0.02 | 1.56 |
| Ex. 57 | 0.3 | 1.0 | O | 0.003 | 0.02 | 1.56 |
| Ex. 58 | <0.1 | <0.1 | O | 0.003 | 0.02 | 1.56 |
| Comp. Ex. 11 | 13 | 50 | O | — | — | 0 |
| Comp. Ex. 12 | 1.0 | 14 | O | — | — | 0 |
| Comp. Ex. 13 | 0.5 | 20 | O | — | — | 0 |
| Comp. Ex. 14 | 0.9 | 40 | O | — | — | 0 |
| Comp. Ex. 15 | 3.5 | 14 | O | — | — | 0 |
| Comp. Ex. 16 | 40 | 100 | O | — | — | 0 |
| Comp. Ex. 17 | 1.0 | 14 | O | — | — | 0 |
| Comp. Ex. 18 | 0.4 | 15 | O | — | — | 0 |
| Comp. Ex. 19 | 122 | 140 | O | — | — | 0 |
| Comp. Ex. 20 | 77 | 130 | O | — | — | 0 |
| Comp. Ex. 21 | 30 | 110 | O | — | — | 0 |
| Comp. Ex. 22 | 6.2 | 47 | O | 0.003 | 0.02 | 0 |
| Comp. Ex. 23 | 5.9 | 47 | O | 0.015 | 0.06 | 0 |
| Comp. Ex. 24 | 1.0 | 14 | O | 0.015 | 0.02 | 0 |
| Comp. Ex. 25 | 1.0 | 14 | O | 0.001 | 0.0004 | 0 |

Pre*8): Measurement before retort treatment
Post*9): Measurement after retort treatment

INDUSTRIAL APPLICABILITY

When a metallic compound is applied to a polymer layer, the produced film exhibits excellent gas-barrier properties. Application of a metallic compound is carried out through a simple, convenient, and inexpensive process as compared with the deposition process. When a polymer layer is heat-treated, water resistance is imparted to the layer, and thus a gas-barrier film exhibiting water resistance and excellent oxygen gas-barrier properties can be produced, and the gas barrier properties of the film are not impaired through washing with water.

What is claimed is:

1. A gas-barrier film comprising (i) a polymer layer formed of a mixture of polyalcohol and at least one poly(meth)acrylic acid polymer selected from the group consisting of poly(meth)acrylic acids and partially neutralized poly(meth)acrylic acids, and (ii) a metallic-compound-containing layer on a surface of the polymer layer, wherein the metallic-compound-containing layer exhibits a mean surface roughness (Ra) of between 0.003–0.019 μm as measured by atomic force microscope (AFM).

2. A gas-barrier film according to claim 1, wherein the metallic-compound-containing layer is continuous.

3. A gas-barrier film according to claim 1, wherein the metallic-compound-containing layer is discontinuous.

4. A gas-barrier film according to claim 1, wherein the polymer layer is fixed onto a surface of a substrate such that said polymer layer is disposed between the substrate and the metallic-compound-containing layer.

5. A gas-barrier film according to claim 1, wherein at least the polymer layer is subjected to heat treatment.

6. A gas-barrier film according to claim 1, wherein the metallic-compound-containing layer includes a mixture of the metallic compound and a resin.

7. A sterilization process which comprises boiling or retorting food packaged with the gas-barrier film according to claim 1.

8. A gas-barrier film comprising (i) a polymer layer formed of a mixture of polyalcohol and at least one poly(meth)acrylic acid polymer selected from the group consisting of poly(meth)acrylic acids and partially neutralized poly(meth)acrylic acids, and (ii) a metallic-compound-containing layer on a surface of the polymer layer, wherein the metallic compound is oxides, hydroxides, or carbonates of at least one species of metal selected from the group consisting of magnesium, calcium, and zinc, and wherein the metallic-compound-containing layer exhibits a mean surface roughness (Ra) of between 0.003–0.03 $\mu$m as measured by atomic force microscope (AFM).

9. A gas-barrier film according to claim 8, wherein the metallic-compound-containing layer exhibits Ra of between 0.003–0.02 $\mu$m as measured by AFM.

10. A gas-barrier film according to claim 8, wherein the metallic-compound-containing layer is continuous.

11. A gas-barrier film according to claim 8, wherein the metallic-compound-containing layer is discontinuous.

12. A gas-barrier film according to claim 8, wherein the polymer layer is fixed onto a surface of a substrate such that said polymer layer is disposed between the substrate and the metallic-compound-containing layer.

13. A gas-barrier film according to claim 8, wherein at least the polymer layer is subjected to heat treatment.

14. A gas-barrier film according to claim 8, wherein the metallic compound-containing layer includes a mixture of the metallic compound and a resin.

15. A sterilization process which comprises boiling or retorting food packaged with the gas-barrier film according to claim 8.

16. A method of making a gas-barrier film comprising applying a metallic-compound-containing material onto a surface of a polymer layer by coating, spraying, powdering, or dipping to form a metallic-compound-containing layer which exhibits a mean surface roughness (Ra) of between 0.003–003 $\mu$m as measured by atomic force microscope (AFM), wherein said polymer layer is formed of a mixture of polyalcohol and at least one poly(meth)acrylic acid polymer selected from the group consisting of poly(meth)acrylic acids and partially neutralized poly(meth)acrylic acids, and wherein the metallic compound is oxides, hydroxides, or carbonates of at least one species of metal selected from the group consisting of magnesium, calcium, and zinc.

17. The method of claim 16, wherein applying the metallic-compound-containing material comprises spraying a metallic compound or a suspension of a metallic compound and a resin onto the polymer layer surface.

18. The method of claim 16, wherein applying the metallic-compound-containing material comprises coating a metallic compound or a suspension of a metallic compound and a resin onto the polymer layer surface.

19. The method of claim 16, wherein applying the metallic-compound-containing material comprises spraying a powder containing a metallic compound onto the polymer layer surface.

* * * * *